Figure 1:
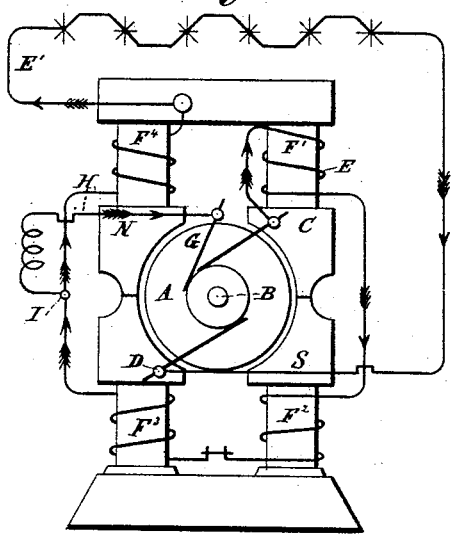

(No Model.)

A. G. WATERHOUSE.
REGULATOR FOR DYNAMO ELECTRIC MACHINES.

No. 389,029. Patented Sept. 4, 1888.

Witnesses,
David W. Brown.
James D. Fox.

Addison G. Waterhouse,
Inventor,

Geo. H. Benjamin,
Attorney.

UNITED STATES PATENT OFFICE.

ADDISON G. WATERHOUSE, OF HARTFORD, CONNECTICUT, ASSIGNOR TO THE WATERHOUSE ELECTRIC AND MANUFACTURING COMPANY, OF SAME PLACE.

REGULATOR FOR DYNAMO-ELECTRIC MACHINES.

SPECIFICATION forming part of Letters Patent No. 389,029, dated September 4, 1888.

Application filed February 18, 1886. Serial No. 192,323. (No model.)

*To all whom it may concern:*

Be it known that I, ADDISON G. WATERHOUSE, a citizen of the United States, and a resident of Hartford, in the State of Connecticut, have invented certain new and useful Improvements in Dynamo-Electric Machines, of which the following is a specification.

My invention relates to the regulation of a dynamo electric machine, whereby the current generated by the machine is preserved constant, irrespective of any changes occurring within the machine itself or in the external circuit within which the machine is included.

In a former application filed by me on November 20, 1885, Serial No. 183,380, I have generally described the construction of a dynamo electric machine and a method by which the machine is self-regulated.

My present invention is an improvement upon the construction and method set forth in the aforesaid application; and it consists of the combination, with a dynamo constructed as described, of a device responding to changes in the main current and mechanism controlled by such responsive device, whereby the resistance of the circuit within which the machine is included may be automatically varied between the main positive brush and the point of connection of the auxiliary brush thereto, and the more perfect regulation of the machine thereby effected.

My invention further relates to the combination, with a machine constructed as described and the electro-responsive device, of a supplemental hand-resistance, which may be employed with or independently of the electro-responsive device for the purpose of adjusting the resistance interposed between the main positive brush and the point of connection of the auxiliary brush.

My invention also relates to the combination, with a machine constructed as described and with the electro-responsive device located as described, of a device responding to changes in the main current, whereby resistance may be cut into the shunt-circuit of said machine, for the purpose hereinafter set forth.

In my previous application I have stated that a machine constructed and balanced as described would be found to be practically self-regulating. In practice this is true within limits; but it is found that the heat generated within the machine when in operation, and also various disturbances in the external circuit, tend, by changing the resistance of the several circuits on the machine or that of the external circuit, to destroy the balance, which is the condition for perfect regulation, and thereby necessitate a new adjustment to meet the changed conditions.

The object of my present invention, therefore, is to provide a means for automatically making the new adjustments required—that is to say, to coact with the method of regulation described in my former application—and thus provide a means for maintaining a perfect balance without human intervention.

In the accompanying drawings, which illustrate my invention, similar letters of reference indicate like parts.

Figure 2:
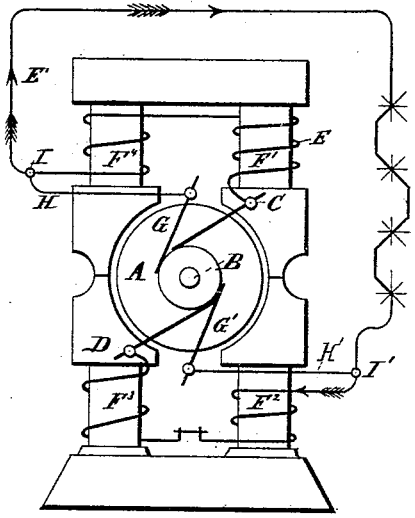
Figure 3:
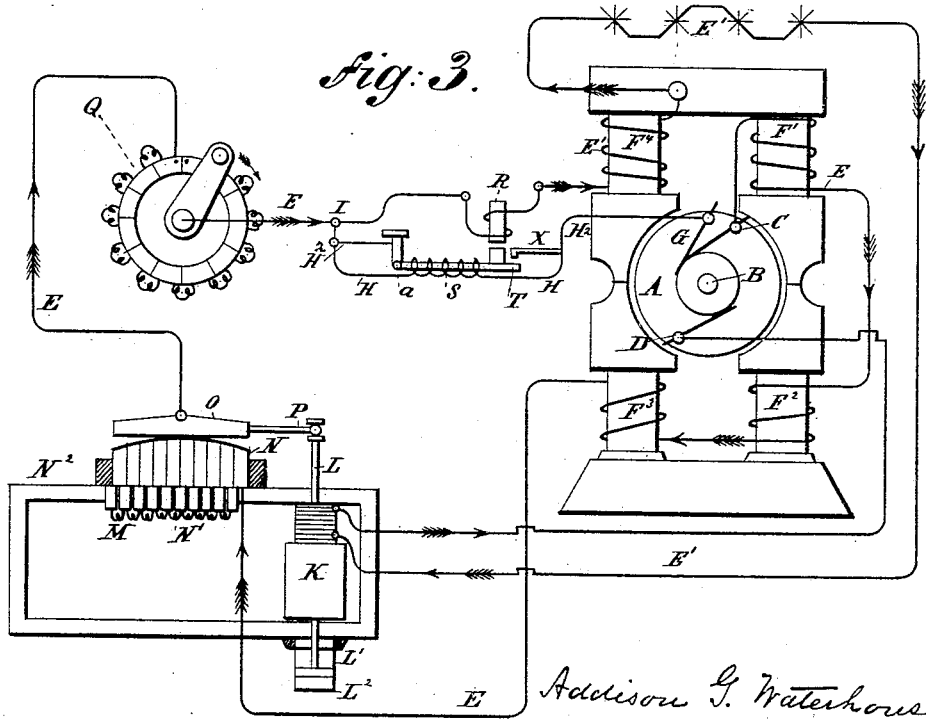

Figure 1 shows a machine in elevation provided with an auxiliary collecting-brush resting upon the commutator in advance of one of the main brushes and connected to the field-circuit of the machine, so as to include three of the magnets in what I term the "field-circuit." Fig. 2 is a similar view showing two auxiliary brushes, one in advance of each of the main brushes and connected as in Fig. 1. Fig. 3 shows a machine connected as in Fig. 1, and also illustrates a hand and automatic resistance located in the field-circuit of said machine, a resistance in the shunt-circuit of said machine, and electro-responsive devices in the main circuit of said machine, which operate to cut resistance into or out of the several circuits, as required.

In the diagrams, A indicates the armature of the dynamo, which may be either of the drum or ring type, and the helices thereon connected to the commutator B in the well-known manner to form a closed circuit. To insure sensitive action of the machine the commutator B should have as great a number of plates and connections as are practicable, in order to reduce the spark to the minimum and so as to take off the current from the armature nearest to the diameter of commutation.

C and D are respectively the + and — collecting-brushes arranged opposite to each other and bearing normally upon the points of maximum and minimum currents of the commutator. The brushes C D are connected together by the conductor E, which is carried around the magnets F', F², F³, and F⁴, connecting them in series and in series with the external resistance.

G is an auxiliary brush, shown in the diagram as bearing upon the commutator in advance of the brush C and connected to the conductor E at I through the medium of the conductor H.

In Fig. 2 two auxiliary brushes, G G', are shown connected through the conductors H and H' with the conductor E at I and I'. The arrangement in Fig. 2 is merely a duplication of that of Fig. 1. I have shown this form in order to illustrate that whatever use can be made of one auxiliary brush—such as brush G as auxiliary to brush C—can also be applied to brush G' as auxiliary to brush D. That portion of the circuit from brush C to G, including the armature-helices, which ends at I, I term, for the purpose of description, the "field-circuit," and from I to brush G the "shunt-circuit."

The theoretical principle governing the operation of a dynamo constructed and connected as shown in Figs. 1 and 2 has been fully set forth in my former application, and which briefly consists in collecting a portion of the generated current by means of an auxiliary brush having a fixed position relative to the main brushes, and in transmitting such current to the working-circuit within which the machine is included, around one or more of the field-magnets, and in varying the electro-motive force of said current in accordance with the shifting of the diameter of commutation of said machine from a prescribed normal point.

Referring now to Fig. 3, K indicates an electro-magnet included in the external circuit, E', of the machine. Within the magnet is the core L, provided with the extension L', extending through the solenoid and adapted to strike on the bottom of the box L² when the core falls by gravity by reason of there being no current in the circuit E'. Interposed in the conductor E is the changeable resistance M, formed of a number of independent coils connected together in the usual manner and to the plates N N' N², the upper ends of which form an arc-shaped surface. Resting upon this surface is the rocker O, connected through the rod P with the armature L of the solenoid K. The rocker O is connected through the conductor E with the resistance-coils of the hand-resistance Q, which in turn is connected through the conductor E with the conductor E', which passes around the magnet F⁴ and from thence to the external circuit.

R represents an electro-magnet in the wire E', and S is a high resistance interposed in the shunt-conductor H, of such an amount as to practically prevent the current from the brush C from passing back over the wire H, and thus short-circuiting the machine.

In the conductor H², which forms a by-path around the resistance S, is an armature, T, pivoted at $a$ and adapted to be actuated by the magnet R when excited and raised until its end strikes the contact-point X, which is connected to the wire H². This by-path when the machine is at rest is open, but closed when the machine is in motion.

The operation of my device is as follows: The current collected from the auxiliary brush, as I have set forth in my former application, serves to increase or diminish the current transmitted through the field-circuit of the machine, and thus regulate the current to the external resistance by reason of the variation of the current from brush G, due to the variation in the electro-motive force of said brush, due to the shifting of the diameter of commutation as effected by the external resistance of the circuit within which the machine is included.

The operation of the device by which the resistance is cut into the field-circuit is as follows: With the machine at full load, the core L of the solenoid K is at its lowest point, and hence the rocker O rests upon the contact-plate N of the changeable-resistance coil. With any change in the external circuit by which the resistance of the circuit is decreased, or any change in the machine itself by which the current transmitted to the external circuit is greater than a predetermined amount, then the magnet K attracts it armature, lifting it upward and rotating the rocker so as to include more of the resistance-coil—say to the point N'. The movement of the core of the solenoid will, of course, continue until its limit of motion is reached or the resistance cut into the circuit is sufficient in amount to reduce the current in the external circuit to the normal amount. In other words, through the instrumentality of this device I am enabled to preserve the relative resistance or balance between the shunt, the field-circuit of the machine, and the external circuit within which the machine is included.

The hand-resistance W (shown in the drawings) is connected in circuit with the automatic resistance, and is merely supplemental thereto and convenient for use in starting the machine. It may be used with the automatic resistance or independently thereof. When the machine is first started, an adjustment may be obtained through the hand-resistance, which will serve until the automatic resistance is brought into action.

In the shunt-circuit I have shown a high resistance, and also a path around this resistance within which is located a device by which this path may be opened or closed. By reason of this arrangement the current is normally transmitted through the path of low resistance and acts automatically. Should the main circuit be broken, the electro-magnet releases the armature, and thus opens the path of low resistance and diverts the current through the path of high resistance, so as to prevent the transmission of a local current in the circuit formed from brush C around the field-magnets to a junction, I, and back through the low-resistance shunt to brush G and the coils of the armature interposed between the brushes C and G. The second function of this arrangement is that sometimes the balance required between the shunt, field, and external circuits, in order to produce self-regulation and maintain a proper current, requires the shunt-circuit to be of such small resistance that at first the machine will not start. I therefore leave the low-resistance path of the shunt-circuit normally open until it is closed by the influence of the main current.

In all cases I have shown the junction of the shunt-circuit at 1 between the field-magnets $F^3$ and $F^4$; but the same may be connected at any point of the circuit within which the machine is included.

I claim as my invention—

1. In a dynamo-electric machine and in combination with an auxiliary collecting-brush, a shunt-conductor connecting said brush to the main circuit, a device located in said main circuit and responding to changes therein, and mechanism consisting of a variable resistance controlled by said responsive device and located in said main circuit between the main positive brush and the point of connection of the shunt-conductor thereto, substantially as and for the purpose set forth.

2. In a dynamo-electric machine and in combination with an auxiliary collecting-brush, a shunt-conductor connecting said brush to the main circuit, and a variable resistance adapted to be operated by hand located in said main circuit between the main positive brush and the point of connection of the shunt-conductor thereto, substantially as and for the purpose set forth.

3. In a dynamo-electric machine and in combination with an auxiliary collecting-brush, a shunt-conductor connecting said brush to the main circuit, a device located in said main circuit and responding to changes therein, mechanism consisting of a variable resistance controlled by said responsive device, and a variable resistance adapted to be operated by hand located in said main circuit between the main positive brush and the point of connection of the shunt-conductor thereto, substantially as and for the purpose set forth.

4. In a dynamo-electric machine and in combination with an auxiliary collecting-brush, a shunt-conductor connecting said brush to the main circuit, a device located in the main circuit and responding to changes therein, and a circuit-breaking device located in the shunt-circuit and controlled by said responsive device, substantially as and for the purpose set forth.

5. In a dynamo-electric machine and in combination with an auxiliary collecting-brush, a shunt-conductor connecting said brush to the main circuit, a device located in the main circuit and responding to changes therein, mechanism consisting of a variable resistance interposed in the main circuit between the main positive brush and point of connection of the shunt-conductor and controlled by such responsive device, a device located in the main circuit and responding to changes therein, and a circuit-breaking device interposed in the shunt-circuit and controlled by such responsive device, substantially as and for the purpose set forth.

ADDISON G. WATERHOUSE.

Witnesses:
BARTOW B. WARD,
CHAS. E. CHAPIN.